US008528820B2

(12) United States Patent
Trajkovic et al.

(10) Patent No.: US 8,528,820 B2
(45) Date of Patent: Sep. 10, 2013

(54) OBJECT IDENTIFICATION USING BARCODE READER

(75) Inventors: Miroslav Trajkovic, Centereach, NY (US); Andrew M. Doorty, Northport, NY (US); Dariusz J. Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 69 days.

(21) Appl. No.: 13/171,587

(22) Filed: Jun. 29, 2011

(65) Prior Publication Data

US 2013/0001290 A1 Jan. 3, 2013

(51) Int. Cl.
*G06K 7/10* (2006.01)

(52) U.S. Cl.
USPC .................................................... 235/462.41

(58) Field of Classification Search
USPC .................. 235/383, 385, 439, 454, 462.01, 235/462.32, 462.41, 494, 495
See application file for complete search history.

(56) References Cited

U.S. PATENT DOCUMENTS 5,243,655 A 9/1993 Wang
7,325,737 B2 * 2/2008 Epshteyn et al. ........ 235/462.08
7,938,331 B2 * 5/2011 Brock et al. ............ 235/462.01
8,146,822 B2 * 4/2012 Drzymala et al. ....... 235/462.41
2004/0223663 A1 11/2004 Cato
2004/0262391 A1 12/2004 Harris et al.

FOREIGN PATENT DOCUMENTS

WO 9601454 A1 1/1996

OTHER PUBLICATIONS

International Search Report and Written Opinion dated Sep. 4, 2012 in related case PCT/US2012/042897.

* cited by examiner

*Primary Examiner* — Seung Lee
(74) *Attorney, Agent, or Firm* — Nong-Qiang Fan

(57) ABSTRACT

A barcode reader for verifying a barcode is attached to an appropriate object particularly suitable for use at a point of sale. A database of expected object signatures in a vicinity of a properly affixed barcode properly is maintained. At a point of sale, the barcode reader obtains an image of a presented barcode (possibly not the correct barcode) and at least a portion of an object to which the presented barcode is affixed. Using data encoded on the presented barcode, the database is accessed to provide an expected signature of the object in the region of the presented barcode. A comparison is made between the expected signature of the object and a sensed signature derived from the image of the object. An improper barcode can thus possibly be identified and further investigation initiated.

17 Claims, 4 Drawing Sheets

OBJECT IDENTIFICATION USING BARCODE READER

TECHNICAL FIELD

The present disclosure relates to an object identifier and more particularly, an object identifier using a Barcode Reader.

BACKGROUND

Point of sale barcode readers may include a camera that captures a digital or pixilated image of the barcode. Such a camera has a pixel array made up of photosensitive elements such as a charge coupled device (CCD) or complementary metal oxide semiconductor (CMOS) device. The barcode reader also typically includes an illumination system having light emitting diodes (LEDs) or a cold cathode fluorescent lamp (CCFL) that directs illumination toward a target object, to which a target barcode is affixed. Light reflected from the target barcode is focused through a lens such that focused light is concentrated onto the pixel array of photosensitive elements. The pixels of the array are sequentially read, generating an analog signal representative of a captured image frame. The analog signal is amplified by a gain factor and the amplified analog signal is digitized by an analog-to-digital converter and stored. Decoding circuitry and/or software of the barcode reader processes the digitized signals and decodes the imaged barcode.

SUMMARY

The present disclosure addresses the problem of fraudulent substitution of barcodes by customers. An image processing method and apparatus is used based on the capabilities of an existing image based barcode reader or scanner. The solution is applicable to imaging barcode scanners including imager-based bioptic scanners.

An exemplary method uses visual object features that are extracted from an item or object to which the barcode is affixed at the time of scanning a barcode. These features (which in combination make up a signature) are extracted by the barcode scanner from an area surrounding the barcode and used to verify that barcode is attached to a correct object.

An exemplary process maintains a database of object signatures expected to be found in a vicinity of barcode properly affixed to a variety of objects. When presented at the point of sale, an image is captured of a presented barcode and at least a portion of an object to which the presented barcode is affixed. Using the data encoded on the presented barcode, information in the database is accessed and used to determine the expected signature of the object in the region of the presented barcode. A comparison is made between the expected signature of the object with a sensed object signature derived from the object presented for purchase. A mismatch in the two signatures is a good indication that tampering has occurred so the store employee is alerted that steps should be taken to confirm the accuracy of the attempted purchase.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Figure 1:
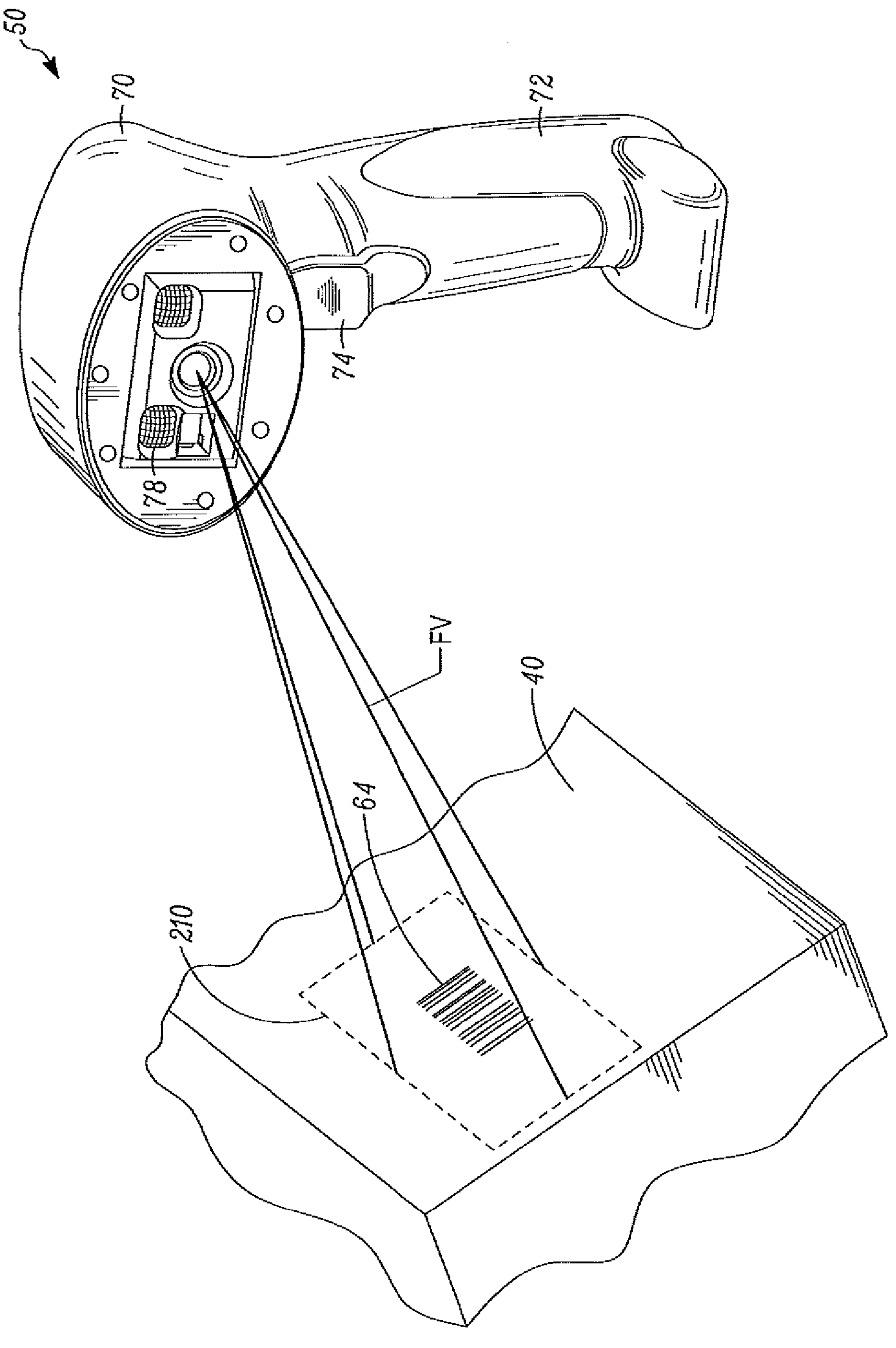
FIG. 1 is a perspective view of a barcode reader having a scan engine for imaging a display or a portable communications device.

FIG. 1 depicts a portable point of sale barcode reader 50 capable of capturing an image of a target object within the reader imaging field of view FV. The concepts disclosed herein have equal applicability to a stationary or fixed imaging based barcode reader such as one where products are moved or scanned past a window so that imaging optics behind the window can form an image of a barcode within the reader's field of view.

Figure 2:
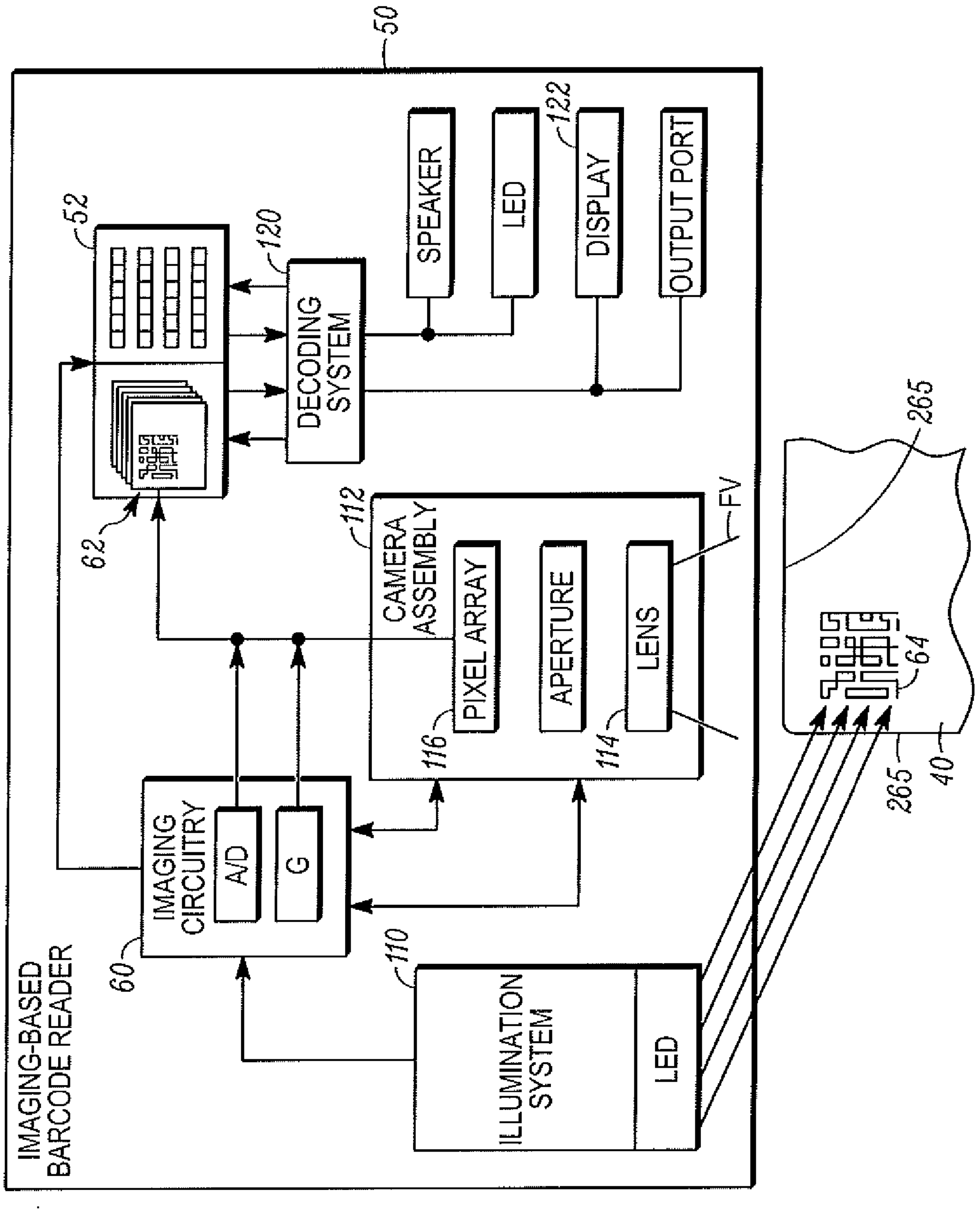
FIG. 2 is schematic depiction of components of an image based barcode reader.

The reader 50 includes illumination and imaging optics that form the field of view FV for imaging a target object. FIG. 2 is a schematic depiction of reader components including a memory 52 and imaging circuitry 60 that acquires and stores captured images 62 from the field of view. The reader decodes 1D or 2D barcodes affixed to an object 40 within the field of view. However, the reader 50 could image and/or read other indicia such as signatures codes, softbar code, finger prints and the like. In one embodiment the reader 50 transmits the information contained in the barcode 64 for evaluation by a point of sale computer 66 coupled to the reader 50.

The process of encoding a 2D barcode is described in detail in U.S. Pat. No. 5,243,655 to Wang which issued Sep. 7, 1993 and which is incorporated herein by reference for all purposes. The '655 patent describes the PDF417 barcode specification and describes how data is encoded into this type of 2D barcode.

Figure 3:
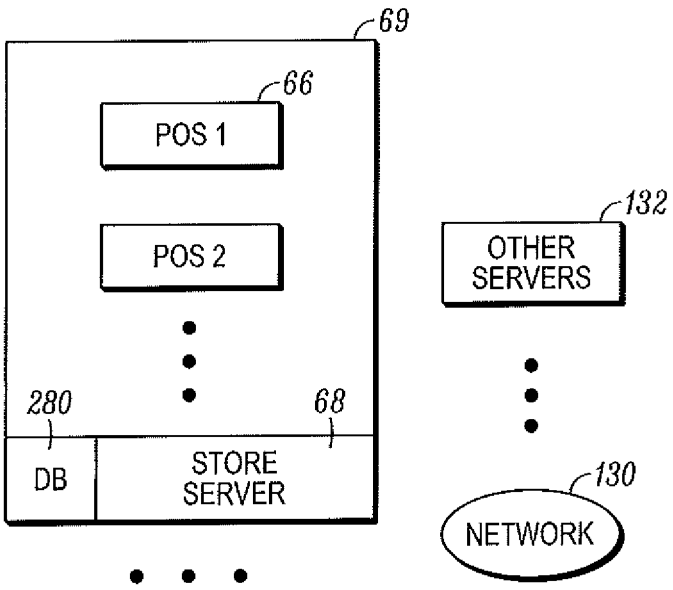
FIG. 3 is a schematic depiction of a network for communicating coupon related information amongst communications devices that access the network.
Figure 4:
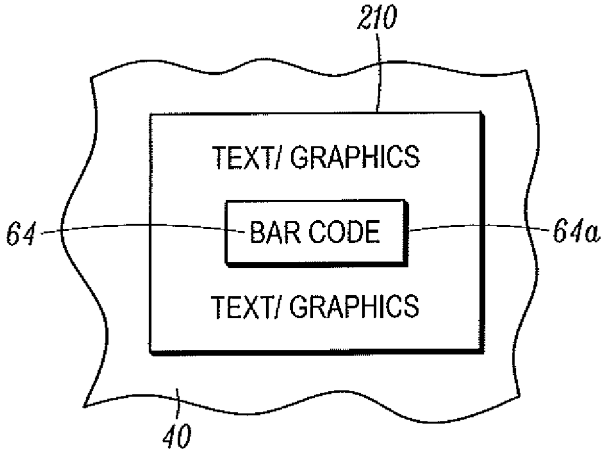
FIG. 4 is an enlarged view of a barcode and region of an object surrounding the barcode.

A store or retail establishment may include multiple portable or stationary point of sale barcode readers (FIG. 3) all coupled through an in store network to a store server 68 within a store 69. The portable reader 50 is shown in FIG. 1. has a housing having a head 70, a handle 72, and an optional trigger 74. Located in the housing is a protective window for protecting an imaging subsystem or scan engine 78.

The scan engine 78 projects an aiming pattern toward a target barcode 64 (or barcodes) on the object 40 and attempts to decode that barcode. The scan engine 78 comprises a chassis that supports a printed circuit board (not shown). Attached to the printed circuit board are several optical components that include, illumination optics 110, aiming optics for generating the aiming pattern, and imaging optics or camera 112. Each of the optical components have a designed field-of-view for projecting or receiving light directed during operation. The imaging optics 112 includes focusing lens or lenses 114 that focus the reflected image from the object 40 onto a sensor array 116 located behind the focusing lens(es). A visible aiming pattern is generated by a laser diode and facilitates a user centering the barcode 64 within the captured image.

When enabled by a controller 60 (FIG. 2), the imaging optics 112 captures an image frame of a field of view FV of the reader 50. When imaging a target barcode 64, the imaging process may need to capture and store in the memory a series of image frames 62 (FIG. 2) in response to multiple user actuations of the trigger. A decoding system 120 analyzes each image frame of the series of image frames 62 and attempts to decode the imaged barcode. All or portions of the images may be stored in a the memory 52.

The barcode reader circuitry is electrically coupled to a power supply, which may be in the form of an on-board battery or a connected off-board power supply. If powered by an on-board battery, the reader 10 may be a stand-alone, portable unit as depicted in FIG. 1. If powered by an off-board power supply, the reader 10 may have some or all of the reader's functionality provided by a connected host computer 66. Circuitry associated with the imaging and decoding systems 60, 120 may be embodied in hardware, software, firmware, electrical circuitry, or any combination thereof and may be disposed within, partially within, or external to a reader housing. The reader 50 also includes a display 122 for the display of text, a speaker for conveying audible indications and one or more output LEDs for simple visual indications such as an indication of a valid barcode decode.

The sensor array 116 may comprise a charged coupled device (CCD), a complementary metal oxide semiconductor (CMOS), or other imaging pixel array, operating under the control of the controller 60. In one exemplary embodiment, the pixel array 116 comprises a two dimensional (2D) mega pixel array with a typical size of the pixel array being on the order of 1280×1024 pixels.

During an imaging session, multiple images of the field of view FV may be obtained by the imaging system 10. An imaging session may be instituted by an operator, for example, pressing the trigger 74 to institute an imaging. Alternately, for a stationary imaging system, an imaging session might start when a lower or bottom edge of an item begin to move through a portion of the field of view FV. After an exposure period, some or all of the pixels of pixel array 116 are successively read out by the controller 60, thereby generating an analog signal scaled by a gain factor which is converted by an analog to digital converter that forms part of the controller 60. The digitized signal comprises a sequence of digital gray scale values typically ranging from 0-255 (for an eight bit processor, i.e., $2^8=256$), where a 0 gray scale value would represent an absence of any reflected light received by a pixel (characterized as low pixel brightness) and a 255 gray scale value would represent a very intense level of reflected light received by a pixel during an integration period (characterized as high pixel brightness). In an alternate embodiment, the barcode reader 50 includes an array which captures and interprets color images.

Barcode Signature

One problem encountered by retailers that use barcode readers at their checkout or point of sales stations is instances of customers intentionally placing an incorrect barcode label on a item presented at the checkout or point of sale. If this fraud is successful, the customer pays a lower price than the original intended price. For example, one can present an expensive vacuum cleaner for purchase, but replace the original barcode with the barcode pulled from a much cheaper stores item. This may cost the store hundreds of dollars on a single transaction.

One technique stores use to mitigate the problem is to attach a scale to the barcode reader. After the item is scanned, it is placed in a bin to determine whether the scanned object has a proper weight. This method requires additional hardware and can only be applied to small items, and even when a proper system is in place it may not always work. A barcode mismatch will not be detected, however, if the cheaper item and the more expensive item have the same weight. Such problems are advantageously overcome through the novel features of the present disclosure.

Figure 5:
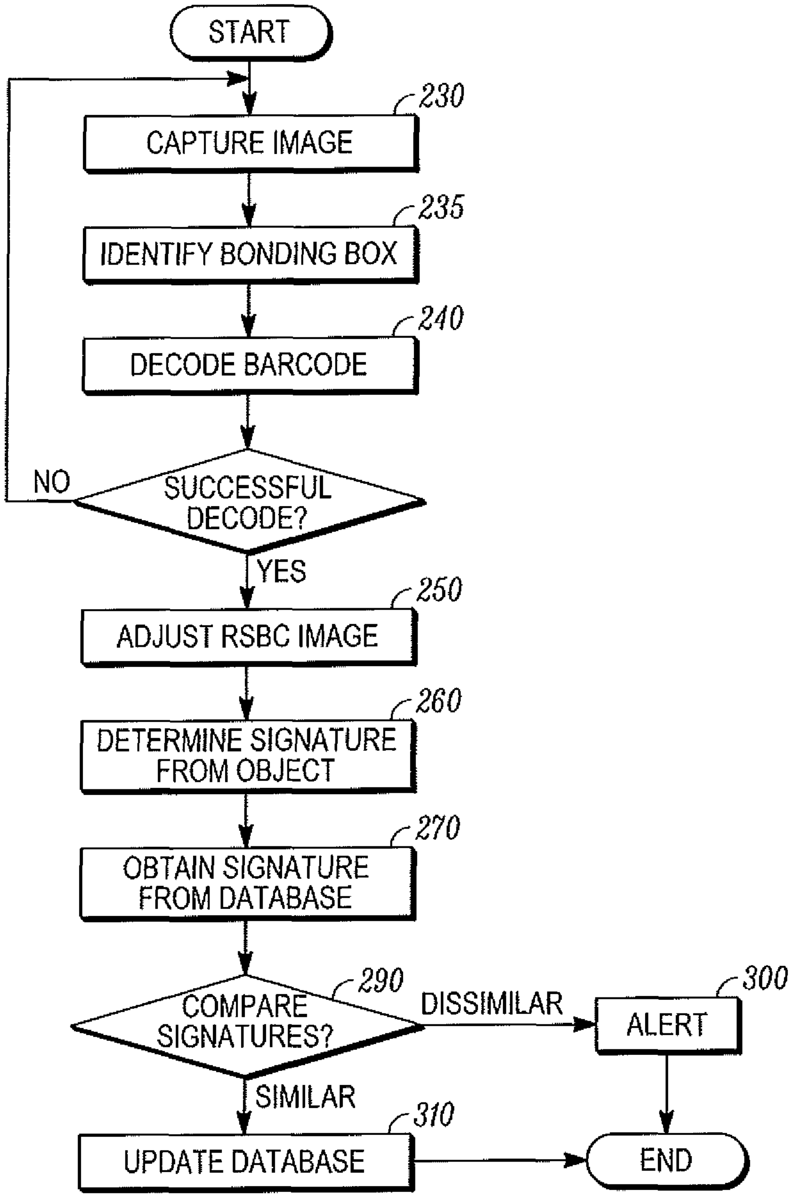
FIG. 5 is a flowchart of a process performed in determining whether an appropriate barcode is affixed to an object.

The exemplary barcode reader 50 captures 230 (see flow chart of FIG. 5) an image and detects 235 the borders or bounding box 64*a* of the barcode 64. The reader 50 has a field of view large enough to capture and interpret a region of interest around the barcode. A Region Surrounding a Barcode 210 (herein RSBC) contains information relating to the object or item to which the barcode is affixed. The RSBC may be fixed (e.g. the area of the barcode scaled three times, may depend on the item, or may be adaptive (e.g. 9 times the area of the barcode, but obtained in such a way that it has maximal information content. Since this flexibility is part of a control program executing in the decoding system 120, it can be reprogrammed based upon the intended use. The exemplary system uses the barcode bounding box 64*a*, and the actual image of the decoded barcode to adjust the image of the RSBC in order to eliminate perspective distortion, curvature, or apply illumination adjustment.

Once a barcode is captured and decoded 240 the RSBC image is adjusted 250 and stored in the memory 52. The software of the decoding system 120 then determines 260 a set of graphical features of the RSBC 210 (excluding the barcode 64). These features may include, but do not have to be limited to: colors or grey level values (i.e. background or foreground, lines or text color), edges 265 (FIG. 2), corners, line segments; moments, Fourier or wavelet coefficients of the original or a gradient image based on derivatives within the image, Zernike moments, principal components of the original or an edge image and or any combination thereof. In one embodiment, multiple features are compared individually, and different thresholds applied, and the signature will only be accepted if there is a strong similarity in all features.

In a bi-optic imaging scanner, multiple cameras are present that register images of an object from various viewpoints in order to decode a bar code that may be present on any of the objects different surfaces. Use of such a scanner allows more than one object view to be used to construct and then verify the bar code signature and one or more features contained within those views.

For recognition purposes the system uses different methods for different features or feature sets, such as correlation, Euclidean distance, k-nearest neighbors, Hidden Markov Models, support vector machines and other statistical pattern recognition processes.

This evaluation is modified by adjustments to the software that implements the recognition to incorporate additional information and in an alternate embodiment includes color information from the RSBC 210. The collection of graphic features obtained from the RSBC 210 is referred to herein as a Barcode Signature.

The barcode content (determined at step 240 above) is then used to obtain 270 a Model or Reference Signature from a database 280. The barcode signature retrieved from the database 280 is compared 290 to the barcode signature derived from the object presented for purchase in order to verify whether a barcode is attached to the object is proper. If an object has multiple barcodes attached to it, multiple Reference Signatures associated with the barcodes are retrieved from the database. Each time an object is scanned; the Reference Signature surrounding each barcode is compared with all areas present on the object.

The Reference Signature is constructed and adjusted as items are scanned following rules of statistical learning and stored it in the database. The Reference Signature or model may be built at the pixel level, in a similar way that is done for tracking applications, when we first create the background model, or at the feature level, in a same way that is done for face or fingerprint recognition. Once the model is created, each time the object is scanned; the area of interest and/or associated features is extracted and compared with the model. If the similarity between the stored image and scanned or captured image is low, an alarm or alert 300 (audible or visual) is conveyed to the store employee so that the cashier/employee can check to determine if a proper item is being scanned. In an alternative embodiment, if the similarity is low the reader will not register an item for purchase. If the similarity in the Signature is high, the model is updated 310. Reference Signature verification may be effectively done at a store server 68 that maintains the database 280, but can also be done by a point of sale computer 66 dedicated to the scanner 50. In that case a Reference Signature may be uploaded to a scanner from the server 68.

The scanner 50 can also store Signatures of most often scanned barcodes within its memory 52 to speed the confirmation. Reference signatures can be built using data from several scanners, several stores of a given retailer or even across all stores having other servers 132 in an industry by means of a network 130. The Reference Signature definition can be uploaded to individual computers on a regular basis.

While the present disclosure has been described with a degree of particularity, it is understood that the invention is defined by the accompanying claims and it is the intent that the invention include all alternatives differing from the exemplary embodiment falling within the spirit or scope of the appended claims.

The invention claimed is:

1. A method of verifying a barcode is attached to an appropriate object comprising:

maintaining a database of an expected object signatures in a vicinity of barcodes properly affixed to associated objects;

at a point of sale, obtaining an image of a presented barcode and at least a portion of an object to which the presented barcode is affixed;

using data encoded on the presented barcode to access the database to determine the expected signature of the object in the region of the presented barcode;

determining a sensed signature derived from the image of the object to which the presented barcode is affixed;

comparing the expected signature of the object with the sensed signature;

providing an indication of the results of the comparing; and wherein an portion of the image within a barcode boundary is used to enhance a portion of the image outside the barcode boundary that includes the object to which the presented barcode is affixed.

2. The method of claim 1 wherein the sensed signature is used to update an object signature within the database.

3. The method of claim 1 wherein the sensed and expected signatures for an object are based on one or more object characteristics.

4. The method of claim 3 wherein at least one characteristic is presence of object edges near the presented barcode.

5. The method of claim 3 wherein at least one characteristic is presence of a graphic near the presented barcode.

6. The method of claim 3 wherein at least one characteristic is contents of a bit mapped image near the presented barcode.

7. The method of claim 3 wherein the at least one characteristic comprises a graphical feature chosen from the group of:

corners, line segments, moments, Fourier or wavelet coefficients of an original or a gradient image, moments, Zernike moments, or principal components.

8. The method of claim 3 wherein a bi-optic scanner having multiple cameras captures multiple images of an object and wherein object signatures from multiple views of the object are obtained and compared with expected signatures.

9. A method of verifying a barcode is attached to an appropriate object comprising:

maintaining a database of an expected object signatures in a vicinity of barcodes properly affixed to associated objects;

at a point of sale, obtaining an image of a presented barcode and at least a portion of an object to which the presented barcode is affixed;

using data encoded on the presented barcode to access the database to determine the expected signature of the object in the region of the presented barcode;

determining a sensed signature derived from the image of the object to which the presented barcode is affixed;

comparing the expected signature of the object with the sensed signature;

providing an indication of the results of the comparing; and wherein the sensed signature includes a numeric indication based on data compression of the grey scale or color contents of an image of the object near the presented barcode and a mismatch between the object and the presented barcode is indicated if a difference in the numeric indication for the sensed and expected signature exceeds a threshold.

10. A method of verifying a barcode is attached to an appropriate object comprising:

maintaining a database of an expected object signatures in a vicinity of barcodes properly affixed to associated objects;

at a point of sale, obtaining an image of a presented barcode and at least a portion of an object to which the presented barcode is affixed;

using data encoded on the presented barcode to access the database to determine the expected signature of the object in the region of the presented barcode;

determining a sensed signature derived from the image of the object to which the presented barcode is affixed;

comparing the expected signature of the object with the sensed signature;

providing an indication of the results of the comparing; and wherein a region of the image surrounding the presented barcode that is evaluated to create the sensed signature is variable based on the contents of the image.

11. A method of verifying a barcode is attached to an appropriate object comprising:

maintaining a database of an expected object signatures in a vicinity of barcodes properly affixed to associated objects;

at a point of sale, obtaining an image of a presented barcode and at least a portion of an object to which the presented barcode is affixed;

using data encoded on the presented barcode to access the database to determine the expected signature of the object in the region of the presented barcode;

determining a sensed signature derived from the image of the object to which the presented barcode is affixed;

comparing the expected signature of the object with the sensed signature;

providing an indication of the results of the comparing; and wherein a size of a bounding box that contains decoded bar code is used to normalize or scale image features when comparing the sensed and expected signatures.

12. Apparatus for verifying that a barcode is attached to an appropriate object comprising:

a memory for storing a database of expected characteristics in a vicinity of barcodes that are properly affixed to associated objects;

a point of sale barcode reader for imaging a presented barcode and comprising optics having a field of view sufficient to obtain an image of the presented barcode and at least a portion of an object to which the presented barcode is affixed;

a controller for interpreting the presented barcode using data contained in the barcode to access the database and determine an expected signature of the object and for deriving a sensed signature from the image of the object in the region of the presented barcode;

said controller programmed to perform a comparison between the expected signature of the object with the sensed signature derived from the image of the object to which the presented barcode is affixed;

an indicator coupled to the controller for indicating a result of the comparison ; and wherein an portion of the image within a barcode boundary is used to enhance a portion of the image outside the barcode boundary that includes the object to which the presented barcode is affixed.

13. The apparatus of claim 12 wherein the database is maintained on an in store server that communicates by means of a network with a plurality of point of sale barcode readers.

14. The apparatus of claim 12 wherein the point of sale barcode reader comprises a barcode reader memory that stores at least a portion of the database.

15. Apparatus for verifying that a barcode is attached to an appropriate object comprising:

a memory for storing a database of expected characteristics in a vicinity of barcodes that are properly affixed to associated objects;

a point of sale barcode reader for imaging a presented barcode and comprising optics having a field of view sufficient to obtain an image of the presented barcode and at least a portion of an object to which the presented barcode is affixed;

a controller for interpreting the presented barcode using data contained in the barcode to access the database and determine an expected signature of the object and for deriving a sensed signature from the image of the object in the region of the presented barcode;

said controller programmed to perform a comparison between the expected signature of the object with the sensed signature derived from the image of the object to which the presented barcode is affixed;

an indicator coupled to the controller for indicating a result of the comparison; and wherein the expected and sensed signatures are derived by the controller from a compressed representation of a bitmapped image.

16. Apparatus for verifying that a barcode is attached to an appropriate object comprising:

a memory for storing a database of expected characteristics in a vicinity of barcodes that are properly affixed to associated objects;

a point of sale barcode reader for imaging a presented barcode and comprising optics having a field of view sufficient to obtain an image of the presented barcode and at least a portion of an object to which the presented barcode is affixed;

a controller for interpreting the presented barcode using data contained in the barcode to access the database and determine an expected signature of the object and for deriving a sensed signature from the image of the object in the region of the presented barcode;

said controller programmed to perform a comparison between the expected signature of the object with the sensed signature derived from the image of the object to which the presented barcode is affixed;

an indicator coupled to the controller for indicating a result of the comparison; and wherein the bar code reader has multiple cameras for capturing different views of an object.

17. Apparatus for verifying a barcode is attached to an appropriate object comprising:

means for maintaining a database of an expected object signature in a vicinity of a barcodes properly affixed to associated objects;

means for obtaining an image of a presented barcode and at least a portion of an object to which the presented barcode is affixed;

means for accessing the database to determine the expected signature of the object in the region of the presented barcode based on the contents of the presented barcode;

means for determining a sensed signature derived from the image of the object to which the presented barcode is affixed;

means for comparing the expected signature of the object with the sensed signature; and means for providing an indication of the results of the comparing; and means for using an portion of the image within a barcode boundary to enhance a portion of the image outside the barcode boundary that includes the object to which the presented barcode is affixed.

* * * * *